US006966959B2

(12) United States Patent
Yanadori et al.

(10) Patent No.: US 6,966,959 B2
(45) Date of Patent: Nov. 22, 2005

(54) METHOD FOR VULCANIZING AN OBJECT FORMED OF UNVULCANIZED RUBBER AND RUBBER PRODUCT

(75) Inventors: Kazuhito Yanadori, Hiratsuka (JP); Hideyuki Ohishi, Hiratsuka (JP); Yoshinori Tamada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 376 days.

(21) Appl. No.: 10/181,685

(22) PCT Filed: Nov. 16, 2001

(86) PCT No.: PCT/JP01/10008

§ 371 (c)(1),
(2), (4) Date: Jul. 19, 2002

(87) PCT Pub. No.: WO02/40240

PCT Pub. Date: May 23, 2002

(65) Prior Publication Data

US 2003/0044568 A1 Mar. 6, 2003

(30) Foreign Application Priority Data

Nov. 20, 2000 (JP) .................................... 2000-352423
Aug. 8, 2001 (JP) .................................... 2001-241109
Oct. 10, 2001 (JP) .................................... 2001-312862
Oct. 16, 2001 (JP) .................................... 2001-318165

(51) Int. Cl.[7] ............................................. F19G 19/00
(52) U.S. Cl. .................... 156/137; 156/87; 156/298; 156/307.1; 474/266; 198/846
(58) Field of Search ................... 156/324, 87, 137, 156/139, 140, 141, 298, 307.1; 474/268, 271, 266, 267; 428/306.6, 308.4, 319.3; 198/846, 847; 264/257, 258

(56) References Cited

U.S. PATENT DOCUMENTS

| 3,860,684 | A | * | 1/1975 | Vance, Sr. .................. 264/157 |
| 3,981,206 | A | * | 9/1976 | Miranti et al. .............. 474/238 |
| 4,150,581 | A | * | 4/1979 | Walters ...................... 474/254 |
| 4,157,752 | A | * | 6/1979 | Sick et al. .................. 198/847 |
| 4,744,843 | A | | 5/1988 | Lewis ......................... 156/87 |
| 4,892,510 | A | * | 1/1990 | Matsuoka et al. .......... 474/252 |
| 6,620,068 | B2 | * | 9/2003 | Aragane et al. ............ 474/205 |

FOREIGN PATENT DOCUMENTS

| JP | H03-132344 | 6/1991 |
| JP | H05-169452 | 7/1993 |
| JP | H08-300508 | 11/1996 |

OTHER PUBLICATIONS

International Search Report PCT/JP01/10008, mailed on Feb. 26, 2002.

* cited by examiner

*Primary Examiner*—Jeff H. Aftergut
*Assistant Examiner*—John L. Goff
(74) *Attorney, Agent, or Firm*—Rader, Fishman & Grauer PLLC

(57) ABSTRACT

A method of vulcanizing an object formed of unvulcanized rubber, in which the unvulcanized-rubber formed object is vulcanized by pressing and heating by mold means, comprises disposing a fiber sheet member on a surface of the unvulcanized-rubber formed object and vulcanizing the unvulcanized-rubber formed object by the mold means.

11 Claims, 2 Drawing Sheets

METHOD FOR VULCANIZING AN OBJECT FORMED OF UNVULCANIZED RUBBER AND RUBBER PRODUCT

TECHNICAL FIELD

This invention relates to a method of vulcanizing an object formed of unvulcanized rubber and a rubber product produced thereby and, more particularly, to a method of vulcanizing an object formed of unvulcanized rubber and a rubber product produced thereby in which the appearance of the rubber product is improved.

BACKGROUND ART

For example, there is an unvulcanized rubber sheet for a conveyor belt as an unvulcanized-rubber formed object. This unvulcanized rubber sheet for a conveyor belt is generally vulcanized and molded using a vulcanizing belt press. During the process of vulcanizing, due to entrapped air, and due to gas, water and the like generated from the unvulcanized rubber material, clearances are produced between the heat plate of the vulcanizing belt press and the surface of the unvulcanized rubber sheet pressed by the heat plate, thereby forming depressions on the obtained conveyor belt surfaces. Therefore, the conveyor belt surface cannot present a substantially smooth and glossy surface and there is a problem of having a bad appearance. Particularly in these years, a good appearance is desired by users in addition to an excellent property.

To solve the above problem, there is conventionally employed a method of coating powder of, for example, zinc stearate, talc, mica or the like on the surface of the unvulcanized rubber sheet. By coating this powder, the entrapped air, and the gas and water (steam) generated from the rubber material (inside) between the heat plate and the unvulcanized rubber sheet at the time of vulcanizing can be exhausted to the outside via the clearance formed between the powder and the heat plate. Accordingly, the generation of depressions is restricted and the conveyor belt which improves appearance can be obtained.

However, in the method of coating powder as described above, due to the insufficient clearance between the unvulcanized rubber sheet and the heat plate, there is a problem that the air and gas cannot be exhausted effectively. Since the powder scatters when coated, there is also a problem of harmful influence on the working environment.

Further as the other method, in Japanese Patent No. 2588209, there is proposed a method for vulcanizing an unvulcanized rubber sheet that has a sheet-like sponge member adhered to the surface thereof, the sheet-like sponge member having a continuous clearance. During vulcanization by a vulcanizing belt press, the rubber being gradually softened enters into the clearance of the sponge member and the rubber pushes out the residue air and the like through the continuous clearance to the outside. Therefore, the generation of the residue air is prevented and depressions is not produced on the surface of the obtained conveyor belt However, in the method using the sponge member, the sponge member is so excellent in expansion that, when adhered to the unvulcanized rubber sheet surface by pressing, the sponge member extends to the longitudinal direction and reduces with respect to the width direction. Therefore, when the sponge member is adhered to the unvulcanized rubber sheet surface, it is likely to generate a part that is lack of the sponge member in one or both end portions of the width direction of the unvulcanized rubber sheet surface. Accordingly, it is difficult to adhere the sponge member through the whole surface of the unvulcanized rubber sheet, and a problem of deteriorating press-processing efficiency is caused. Further, since the obtained conveyor belt has a structure such that the sponge member having a low strength is disposed on the surface, the abrasion resistance of the surface is deteriorated.

DISCLOSURE OF THE INVENTION

It is an object of the invention to provide a method of vulcanizing an object formed of unvulcanized rubber and a rubber product obtained thereby, capable of improving the appearance of the obtained rubber product while not harmfully influencing on the work environment, and not deteriorating the press-processing efficiency or product property.

To achieve the above object, a method of vulcanizing an object formed of unvulcanized rubber according to the present invention, in which the unvulcanized-rubber formed object is vulcanized by pressing and heating by mold means, comprises disposing a fiber sheet member on a surface of the unvulcanized-rubber formed object and vulcanizing the unvulcanized-rubber formed object by the mold means.

A rubber product according to the present invention comprises a vulcanized-rubber formed object and a fiber sheet member embedded in a surface portion thereof.

In accordance with the present invention, since the fiber sheet member is disposed on a surface of the unvulcanized-rubber formed object to be vulcanized, the residue air, and gas and water generated from the unvulcanized rubber material can be effectively pushed out to the outside of the mold means by the rubber gradually softening and entering into the clearance of the fiber sheet member. Therefore, the surface of the obtained rubber product can be prevented from generating depressions. Thus, the surface of the obtained rubber product can present a substantially smooth and glossy surface and the rubber product can have a good appearance.

A good working environment can always be maintained, because no powder harmfully affecting on the working environment is used. Since the fiber sheet member is not extended or contracted so much as the sponge member and has a greater strength than that, the press-processing efficiency is prevented from deterioration if the fiber sheet member is pressed onto the unvulcanized-rubber formed object, and the abrasion resistance of the rubber product surface is not lowered.

DESCRIPTION OF THE PREFERRED EMBODIMENTS

The embodiments in accordance with the present invention will be described below with reference to the drawings, using an unvulcanized rubber sheet for a belt conveyor as an unvulcanized-rubber formed object.

Figure 1:
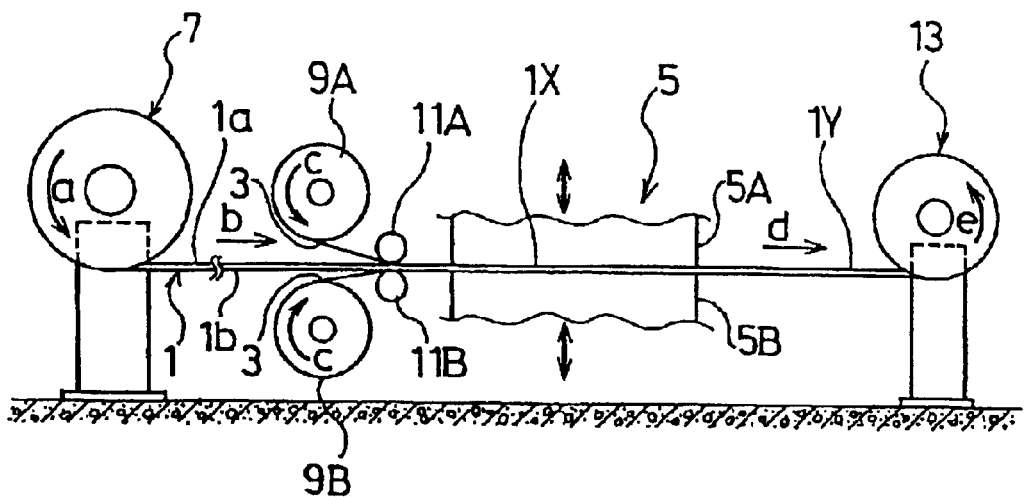
FIG. 1 is an explanatory view showing one example of a method for vulcanizing an unvulcanized-rubber formed object according to the invention.

As shown in FIG. 1, the numeral 1 shows an unvulcanized rubber sheet for a conveyor belt in a long belt-like shape, the numeral 3 long belt type fiber sheet members and the numeral 5 a mold means for molding the unvulcanized rubber sheet 1.

The unvulcanized rubber sheet 1 is wound via an adhesion-preventing liner (not shown) around an unwinding roll 7 which is disposed at the upper flow side of the mold means 5. The fiber sheet members 3 are wound around upper and lower rolls 9A, 9B, respectively, and stocked there, which are placed between the unwind roll 7 and the mold means 5.

Provided between the rolls 9A, 9B and the mold means 5 are press rollers 11A, 11B for pressing the fiber sheet members 3 unwound from the rolls 9A, 9B onto the upper and lower surfaces 1a, 1b of the unvulcanized rubber sheet 1. At the lower flow side of the mold means 5, there is disposed a winding roll 13 for winding a vulcanized rubber sheet 1Y that has been vulcanized by the mold means 5. The mold means 5 is a vulcanizing belt press having upper and lower heat plates 5A, 5B capable of moving up and down to press and heat the unvulcanized rubber sheet 1.

In the vulcanization method of the present invention, first, the unvulcanized rubber sheet 1 is unwound from the unwind roll 7 as shown by an arrow a, and is supplied to the direction shown by an arrow b while removing the adhesion-preventing liner (not shown). The fiber sheet members 3 are unwound from the rolls 9A, 9B toward the direction shown by arrows c, and pressed and adhered to the upper and lower surfaces 1a, 1b of the unvulcanized rubber sheet 1 by the press rollers 11A, 11B consecutively.

The unvulcanized rubber sheet 1X provided with the fiber sheet members 3 on the both surfaces thereof is then transported between the upper and lower heat plates 5A, 5B. The upper and lower heat plates 5A, 5B, respectively, at the upper and lower waiting positions are moved toward the unvulcanized rubber sheet 1X to press and heat it for vulcanization. At the time of vulcanizing, air entrapped, and gas, water, etc., produced from the unvulcanized rubber material remain between the heat plates 5A, 5B and the upper and lower surfaces 1a, 1b of the unvulcanized rubber sheet 1.

The unvulcanized rubber sheet 1X pressed and heated between the heat plates 5A, 5B is softened from the central portion toward the peripheral portion. Therefore the softened rubber enters from the central portion side of each of the fiber sheet members 3 into the clearance of the fiber sheet member 3, gradually pushes the air, the gas, and the water toward the outside thereof and finally excludes them to the outside of heat plates 5A, 5B.

Figure 2:
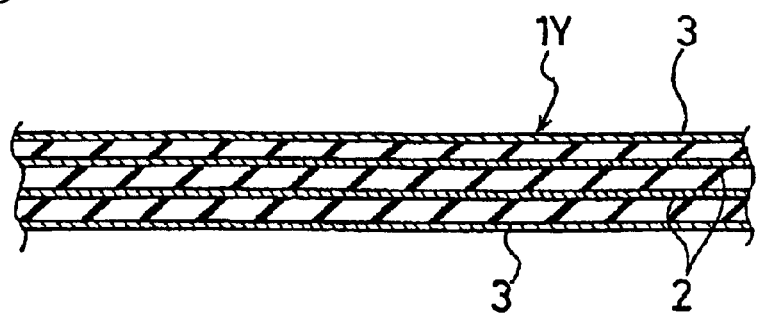
FIG. 2 is an enlarged cross-sectional view showing a main part of a rubber product obtained by the method in FIG. 1.

The heat plates 5A, 5B separate from each other when the vulcanization is terminated. As a result, as shown in FIG. 2, a conveyor belt (rubber product) can be obtained having the fiber sheet members 3 embedded in the surface portions of the vulcanized rubber sheet (vulcanized-rubber formed object) 1Y. As shown by an arrow d, the vulcanized rubber sheet 1Y is transported towards the winding roll 13 and is wound around the winding roll 13 as shown by an arrow e. In FIG. 2, the numeral 2 shows reinforce layers embedded in the vulcanized rubber sheet 1Y.

In accordance with the present invention, since the fiber sheet members 3 are disposed on the surfaces 1a, 1b of the unvulcanized rubber sheet 1 to be vulcanized, the residue air, gas, and water can be effectively excluded from the clearance of the fiber sheet members 3 to the outside thereof. Therefore, no depression appears on the surfaces of the obtained conveyor belt unlike the prior art. Accordingly, the surfaces of the conveyor belt are substantially smooth and glossy, and the appearance of the conveyor belt can be improved.

The deterioration of working environment can be prevented because no powder which deteriorates the working environment is used. In addition, since the fiber sheet members 3 do not extend much unlike the sponge members, the press-processing efficiency can not be lowered even if the fiber sheet members 3 are pressed on the unvulcanized rubber sheet 1. The fiber sheet members 3 are greater in strength than the sponge members, so the resistance of the surfaces of the obtained conveyor belt to abrasion is not deteriorated.

Figure 3:
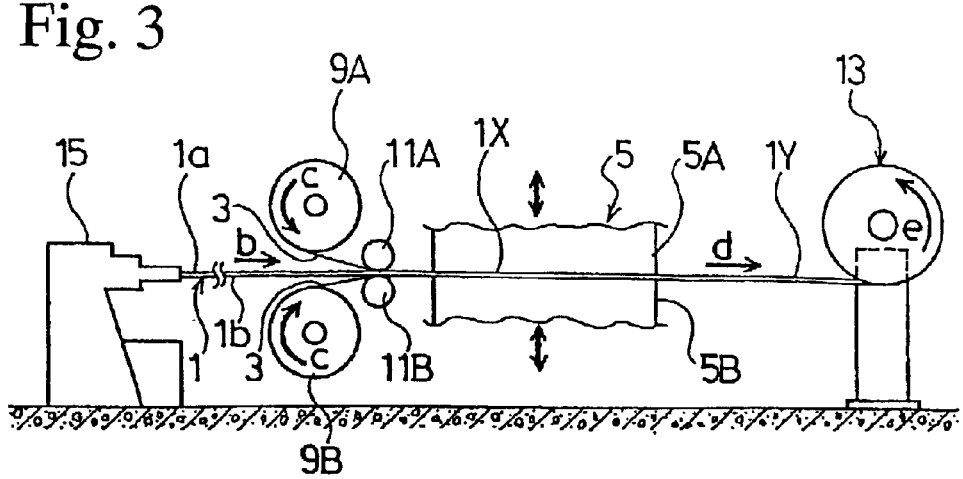
FIG. 3 is an explanatory view showing another example of a method for vulcanizing an unvulcanized-rubber formed object according to the invention.

FIG. 3 shows another example of a method for vulcanizing an unvulcanized-rubber formed object according to the present invention. In this embodiment, in place of the unvulcanized rubber sheet wound around the unwind roll 7, an unvulcanized rubber sheet 1 pressed out by an extruder 15 is used. This unvulcanized rubber sheet 1 has no reinforce layers 2 described above. In this way the unvulcanized rubber sheet 1 extruded from the extruder 15 may be directly used without winding it around the unwinding roll 7. The same components as those in FIG. 1 have the same numerals and the description thereof will be omitted.

Figure 4:
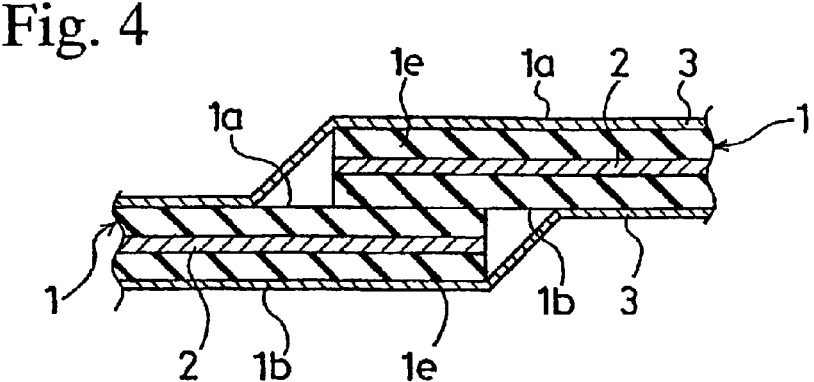
FIG. 4 is an enlarged cross-sectional view showing a main part of another example of the unvulcanized-rubber formed object used in a method for vulcanizing an unvulcanized-rubber formed object according to the invention.

FIG. 4 shows another example of the unvulcanized rubber sheet used for the vulcanizing method of the present invention. This embodiment illustrates a conveyer belt formed into one unit by vulcanization from two unvulcanized rubber sheets 1, end portions 1e of which are overlapped in contact with each other. Fiber sheet members 3 are respectively adhered onto the upper and lower surfaces 1a, 1b of the unvulcanized rubber sheets 1 the end portions 1e of which are brought into contact with each other as describe above, and the rubber sheets are then disposed between the upper and lower heat plates 5A, 5B of the vulcanizing belt press and vulcanized. The obtained conveyor belt having the end portions 1e which have been integrally connected with each other can exhibit the same effects described above.

Figure 5:
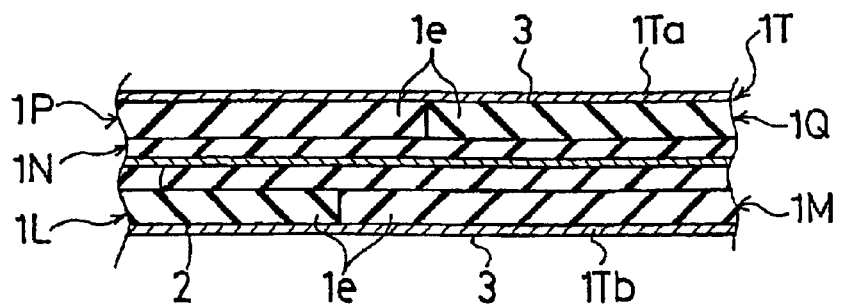
FIG. 5 is an enlarged cross-sectional view showing a main part of further another example of an unvulcanized-rubber formed object used in a method for vulcanizing an unvulcanized-rubber formed object according to the invention.

FIG. 5 illustrates further another example of the unvulcanized rubber sheet used for the vulcanizing method of the present invention. In this embodiment, unvulcanized rubber sheets 1L, 1M, 1N, 1P, 1Q are unitarily joined by vulcanization to obtain a conveyer belt.

The end portions 1e of the first unvulcanized rubber sheet 1L and second unvulcanized rubber sheet 1M on the lower side butt against each other. The third unvulcanized rubber sheet 1N embeded with a reinforce layer 2 is laminated on the unvulcanized rubber sheets 1L, 1M. The fourth and fifth unvulcanized rubber sheets 1P, 1Q are laminated on the third unvulcanized rubber sheet 1N. As in the first and second unvulcanized rubber sheets 1L, 1M, end portions 1e of the fourth and the fifth unvulcanized rubber sheets 1P, 1Q, butt against each other.

Fiber sheet members 3 are respectively adhered onto the upper and lower surfaces 1Ta, 1Tb of the unvulcanized rubber sheet laminate 1T of the above structure, and the laminate 1T is then placed between the upper and lower heat plates 5A, 5B and vulcanized. The obtained conveyor belt comprising the rubber sheets 1L, 1M, 1N, 1P, 1Q which have joined into one unit, can exhibit the same effects described above.

In the present invention, the fiber sheet members 3 may be used having any of such structures capable of exhausting the residue air or the like to the outside through the clearance during vulcanization. For example, textile fabrics or knit fabrics in sheet can be preferably used. Nonwoven fabrics may also be used.

For fiber materials of the fiber sheet members 3, any of fiber materials having a higher melting point than the vulcanizing temperature may be used. For instance, nylon fiber, polyester fiber, etc., having a melting point of 180° C. or more can be preferably employed.

When textile fabrics or knit fabrics are used for the fiber sheet members 3, it is preferable that the mass per unit area thereof may be 5 to 30 g/m². If the mass per unit area is less than 5 g/m², the generation of crinkling can easily happen when the fiber sheet members 3 are adhered onto the unvulcanized rubber sheet 1 by pressing. And since it is difficult to effectively exclude the air, etc., depressions can easily be produced. If the mass per unit area is more than 30 g/m², the consumption volume of the fiber sheet members 3 is be too exceeded. Since the difference between the color of the fiber sheet members 3 embedded in the surface portions and the original color (black in general) of the vulcanized rubber becomes apparent, the appearance is deteriorated. Moreover, as the adhesion between the fiber sheet members 3 and the vulcanized rubber is lowered, the abrasion resistance of the surfaces of the obtained conveyor belt is lowered.

The thickness of the fiber sheet members 3 using textile fabrics or knit fabrics may be preferably 0.05 to 0.40 mm. If the thickness is out of the above range, the same problems as described in case of the mass per unit area are caused.

In case of using nonwoven fabrics for the fiber sheet members 3, it is preferable that the mass per unit area is 10 to 25 g/m². The thickness thereof may preferably be 0.05 to 0.20 mm. If the mass per unit area and the thickness are out of the above ranges, the same problems as described above are caused.

In case of using nonwoven fabrics for conveyor belts, at least in the direction of the compressive stress acting upon the conveyer belt, it is preferable that the extension degree at the time of cutting is set to be 25% or more and the extension degree under $1/10$ of load of the cutting strength is set to be 10% or more. These may be set in the same manner for the case of other rubber products.

If the extension degree at the time of cutting is less than 25%, or the extension degree under $1/10$ of load of the cutting strength is less than 10%, the nonwoven fabric, when the compressive stress acts upon the belt in services, is buckled, and crinkling occurs on the conveyor belt surfaces. Therefore, the belt appearance is deteriorated and the surface abrasion resistance is lowered. It is preferable that the upper limit value of the extension degree in cutting is 50% and the upper limit value of the extension degree under $1/10$ of load of the cutting strength is set to be 20%. If the extension degrees exceed these upper limit values, the fiber sheet members extend greatly, thereby deteriorating the press-processing efficiency as in the sponge member.

In these embodiments, the unvulcanized rubber sheets for a conveyor belt are described as examples of the unvulcanized-rubber formed objects. However, the present invention is not limited thereto and will be adequately used for any of unvulcanized-rubber formed objects, which have the same problems as described in the prior art.

EXAMPLE 1

Conveyer belts having a structure shown in FIG. 2 were prepared by vulcanizing unvulcanized rubber sheets for a conveyor belt by the vulcanizing methods 1 to 3 of the present invention, the unvulcanized rubber sheets having fiber sheet members shown in Table 1. Each fiber sheet member was made of Nylon 6, and its mass per unit area was 10 g/m² and the thickness thereof was 0.2 mm.

Conveyer belts having a structure with no fiber sheet member in FIG. 2 were also prepared by vulcanizing unvulcanized rubber sheets for a conveyor belt by the conventional vulcanizing method using powder of zinc stearate (conventional method 1) and by the conventional vulcanizing method using talc powder (conventional method 2). The powder was applied for 10 g per 1 m² in each vulcanizing methods.

A conveyer belt having sponge members made of polyurethane (a thickness of 1 mm) in place of the fiber sheet members in the conveyer belt with a structure of FIG. 2 was also prepared by vulcanizing an unvulcanized rubber sheet by the conventional vulcanizing method (the conventional method 3) using the sponge members.

In each vulcanizing method, a vulcanizing belt press was used, the vulcanization temperature being 150° C., the vulcanization time period being 30 minutes. Rubber (NR/SBR system rubber) mixed with natural rubber and styrene-butadiene rubber was used for each of the unvulcanized rubber sheets for a conveyor belt in the vulcanizing methods, and the width of the rubber sheets was 1 m, the thickness 10 mm and the length 20 m.

Evaluation tests for the generation rate of depressions, surface color condition, working environment, press-processing efficiency of the fiber sheet members and the sponge members, and surface abrasion resistance were conducted under the following measuring conditions to the conveyer belts obtained by the vulcanizing methods. The results were shown in Table 1.

Generation Rate of Depressions

The number of depressions generated on the surfaces of the conveyor belt which is obtained by each method is counted and the obtained number is converted into the generation rate per 10 m².

Surface Color Condition

The test is conducted in accordance with JIS Z8723, "Visual Comparative Evaluation of Surface Color". The results are evaluated in three ranks by ○, Δ, X. ○ means no problem and a good condition (if any, however little), Δ means that some problem exists (depressions are clearly confirmed), and X means that a great problem exists (the generation of depressions are seen in a wide range) and considerable deterioration is caused.

Working Environment

After producing each conveyor belt by each vulcanizing method, the polluted state in the whole processes including the equipment is observed. The results are evaluated in three ranks by ○, Δ, X. ○ means no problem and a good state, Δ means that some problem exists, and X means that a great problem exists and considerable deterioration is caused.

Press-Processing Efficiency of Fiber Sheet Member and Sponge Member

At the time of producing the conveyor belt, after pressing the fiber sheet members and the sponge members onto the surfaces of the unvulcanized rubber sheets by press rollers, the adhesion state of each fiber sheet member or sponge member on the surface of the sheet obtained is visually observed. The results are evaluated in three ranks by ○, Δ, X. ○ means no problem and a good state, Δ means that some problem exists, and X means that a great problem exists (in a wide range of unvulcanized rubber sheet surface, portions lack of the fiber sheet member or the sponge member are generated, or crinkling is observed) and considerable deterioration is caused.

Surface Abrasion Resistance

The conveyor belt obtained by each method is cut into a rectangular test piece having a width of 25 mm and a length of 40 cm. The test piece is bent one million times under the condition of a pulley diameter of 50 mm, load of 250N/ overall width, according to Press and Bending Fatigue Strength Evaluation (A Method) which is described in JIS L1017. The surface of each test piece is then visually observed. The results are evaluated in three ranks by ○, Δ, X. ○ means no problem and a good state such that only the outer rubber surface of the test piece is abraded and little generation of fuzz, rough surface, and detachment of the fiber sheet member or of the sponge member can be observed, Δ means some problem such that fuzz, rough surface and/or detachment of the fiber sheet member or of the sponge member can be slightly observed, and X means a great problem such that fuzz, rough surface and/or detachment of the fiber sheet member or of the sponge member can be apparently observed and considerable deterioration is caused.

were vulcanized by vulcanizing methods using the fiber sheet members (Methods A to E), and conveyor belts having a composition as shown in FIG. 2 were obtained. Other conditions were the same as in the example 1.

Evaluation tests for the generation rate of depressions, surface color condition, working environment, press-processing efficiency of the fiber sheet members and the sponge members, and surface abrasion resistance were conducted under the same measuring conditions as shown in the example 1 to the conveyer belts obtained by the vulcanizing methods. The results were shown in Table 2.

TABLE 1

|  | Method 1 of the Present invention | Method 2 of the Present invention | Method 3 of the Present invention | Conventional Method 1 | Conventional Method 2 | Conventional Method 3 |
|---|---|---|---|---|---|---|
| Fiber Sheet Member | Knit fabric | Textile fabric | Nonwoven fabric | — | — | — |
| Generation Rate of Depressions (number/10 m$^2$) | 0 | 0 | 0 | 1.3 | 1.1 | 0 |
| Surface Color Condition | ○ | ○ | ○ | ○ | Δ | ○ |
| Working Environment | ○ | ○ | ○ | Δ | Δ | ○ |
| Press-Processing Efficiency | ○ | ○ | ○ | — | — | X |
| Surface Abrasion Resistance | ○ | ○ | ○ | ○ | ○ | Δ |

As shown in Table 1, the vulcanizing methods of the present invention can obtain conveyer belts (rubber products) having a good appearance, without deteriorating the working environment, the press-processing efficiency of the fiber sheet member and the surface abrasion resistance.

As shown in Table 2, it is understood that the mass per unit area of the fiber sheet members composed of knit-fabric is preferably 5 to 30 g/m$^2$.

TABLE 2

|  | Vulcanizing Method A | Vulcanizing Method B | Vulcanizing Method C | Vulcanizing Method D | Vulcanizing Method E |
|---|---|---|---|---|---|
| Unit Mass (g/m$^2$) | 4 | 5 | 10 | 30 | 35 |
| Generation Rate of Depressions (number/10 cm$^2$) | 0.2 | 0 | 0 | 0 | 0 |
| Surface Color Condition | ○ | ○ | ○ | ○ | Δ~X |
| Working Environment | ○ | ○ | ○ | ○ | ○ |
| Press-Processing Efficiency | X (crinkling) | ○ | ○ | ○ | ○ |
| Surface Abrasion Resistance | ○ | ○ | ○ | ○ | Δ~X |

EXAMPLE 2

Fiber sheet members were prepared each having the mass per unit shown in Table 2, the fiber sheet members being made of the same knit fabric as used in the example 1. Unvulcanized rubber sheets with these fiber sheet members

EXAMPLE 3

Fiber sheet members were prepared each having the mass per unit shown in Table 3, the fiber sheet members being made of the same nonwoven fabric as used in the example 1. Each nonwoven fabric was arranged such that the extension degree at the time of cutting was 35%, and the extension degree under 1/10 of load of the cutting strength was 14%. Unvulcanized rubber sheets with these fiber sheet members were vulcanized by vulcanizing methods using the fiber sheet members (Methods F to J), and conveyor belts having a composition as shown in FIG. 2 were obtained. Other conditions were the same as in the example 1.

Evaluation tests for the generation rate of depressions, surface color condition, working environment, press-processing efficiency of the fiber sheet members and the sponge members, and surface abrasion resistance were conducted under the same measuring conditions as shown in the example 1 to the conveyer belts obtained by the vulcanizing methods. The results were shown in Table 3.

TABLE 3

|  | Vulcanizing Method F | Vulcanizing Method G | Vulcanizing Method H | Vulcanizing Method I | Vulcanizing Method J |
|---|---|---|---|---|---|
| Unit Mass (g/m$^2$) | 7 | 10 | 15 | 25 | 30 |
| Generation Rate of Depressions (number/10 cm$^2$) | 0.2 | 0 | 0 | 0 | 0 |
| Surface Color Condition | ◯ | ◯ | ◯ | ◯ | X |
| Working Environment | ◯ | ◯ | ◯ | ◯ | ◯ |
| Press-Processing Efficiency | X (crinkling) | ◯ | ◯ | ◯ | ◯ |
| Surface Abrasion Resistance | ◯ | ◯ | ◯ | ◯ | Δ |

As shown in Table 3, it is understood that the mass per unit area of the fiber sheet members made of nonwoven fabric is preferably 10 to 25 g/m$^2$.

As described above, according to the method of the present invention for vulcanizing an object formed of unvulcanized rubber, since the fiber sheet member is disposed on the surface of the unvulcanized-formed object to be vulcanized, the residue air and the like can be excluded from the clearance of the fiber sheet member to the outside during vulcanization. Therefore, depressions produced on the surface of the obtained rubber produce can be prevented. Accordingly, the surface of the rubber product obtained can be substantially smooth and glossy and it has a good appearance.

Since powder harmfully affecting on the working environment is not used, a good working environment can be maintained. In addition, the fiber sheet member has a higher strength than the sponge member, and is not easily extended or contracted, so the processing efficiency at the time of pressing and surface abrasion resistance can not be lowered.

POSSIBILITY OF INDUSTRIAL USE

The vulcanizing method of the present invention, which has excellent effects described above, is very useful to vulcanize unvulcanied-rubber formed objects in the vulcanizing process when rubber products such as conveyer belts are produced.

What is claimed is:

1. A method of vulcanizing a conveyor belt, said method comprising:

disposing a fiber sheet member on a surface of an unvulcanized rubber sheet, and heating under pressure with a heat plate said disposed fiber sheet member/unvulcanized rubber sheet to vulcanize said unvulcanized rubber sheet and embed said fiber sheet member into said surface of said vulcanized rubber sheet, wherein said fiber sheet member comprises (1) a knit fabric, (2) a mass per unit area of 5 to 30 g/m$^2$, and (3) a thickness of 0.05 to 0.40 mm.

2. The method according to claim 1, wherein said fiber sheet member is formed of a fiber material having a melting point higher than vulcanizing temperature.

3. The method according to claim 2, wherein the fiber material of said fiber sheet member has a melting point equal to 180° C. or higher.

4. The method according to any one of claims 1 to 3, wherein said fiber sheet member is disposed on surfaces at the end portions of the unvulcanized rubber sheet which come into contact with each other.

5. The method according to any one of claims 1 to 3, wherein said fiber sheet member is pressed on the surface of said unvulcanized rubber sheet.

6. The method according to any one of claims 1 to 3, wherein said fiber sheet member is disposed on an upper and a lower surface of said unvulcanized rubber sheet.

7. The method according to claim 6, wherein said heat plate heats under pressure at the upper and lower surfaces of said disposed fiber sheet member/unvulcanized rubber sheet.

8. The method according to any one of claims 1 to 3, wherein said unvulcanized rubber sheet comprises a reinforce layer embedded therein.

9. A conveyor belt obtained by the method according to claim 1.

10. A conveyor belt comprising a fiber sheet member and a vulcanized rubber sheet, wherein the fiber sheet member is embedded in a surface of said vulcanized rubber sheet and comprises (1) a knit fabric, (2) a mass per unit area of 5 to 30 g/m$^2$, and (3) a thickness of 0.05 to 0.40 mm.

11. The conveyor belt according to claim 10, further comprising a reinforce layer embedded in said vulcanized rubber sheet.

* * * * *